United States Patent Office 3,703,507
Patented Nov. 21, 1972

3,703,507
PROCESS FOR THE PRODUCTION OF 9-(β-D-ARABINOFURANOSYL) ADENINE, 5'-PHOSPHATE AND SALTS THEREOF
Theodore H. Haskell, Ann Arbor, and Donald R. Watson, Pinckney, Mich., assignors to Parke, Davis & Company, Detroit, Mich.
No Drawing. Filed Sept. 26, 1969, Ser. No. 861,485
Int. Cl. C07d 51/54
U.S. Cl. 260—211.5 R          4 Claims

ABSTRACT OF THE DISCLOSURE

Process for the production of 9-β-D-arabinofuranosyl) adenine, 5'-phosphate and salts thereof by reacting 9-(β-D-arabinofuranosyl)adenine with phosphorus oxychloride in glacial acetic acid in the presence of a tertiary amine base at a temperature between about 0 and about 25° C. for a period that may vary from about 2 to about 20 hours.

SUMMARY AND DETAILED DESCRIPTION

The present invention relates to a process for the production of 9-(β-D-arabinofuranosyl)adenine, 5'-phosphate, which in the free acid form has the formula

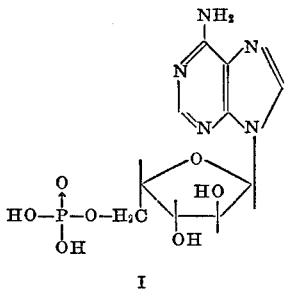

I and salts thereof. More particularly, the invention relates to a process for the production of 9-(β-D-arabinofuranosyl)adenine, 5'-phosphate and salts thereof which comprises reacting 9-(β-D-arabinofurnosyl)adenine with phosphorus oxychloride in glacial acetic acid in the presence of a tertiary amine base.

In accordance with the invention, 9-(β-D-arabinofuranoyl)adenine, 5'-phosphate and salts thereof are produced by reacting 9-(β-D-arabinofuranosyl)adenine with phosphorus oxychloride in glacial acetic acid in the presence of a tertiary amine base at a temperature between about 0 and about 25° C. for a period that may vary from about 2 to about 20 hours. Some examples of tertiary amine bases that may be used in the reaction are triethylamine, pyridine, and 2,6-dimethylpyridine. The preferred such base is pyridine. While satisfactory results can be achieved at the reaction conditions given above, it is preferable to carry out the reaction at a temperature between 0 and 10° C., and at such temperature, the reaction is essentially complete after about 3–5 hours. To insure optimum yields, both the phosphorus oxychloride and the tertiary amine base are used in substantial excess, namely, about 4 to 8 moles of phosphorus oxychloride and about 2 to 10 moles of base for each mole of 9-(β-D-arabinofuranosyl)adenine. The glacial acetic acid is employed in an amount at least equivalent to the amount of phosphorus oxychloride used and preferably is present in large excess.

The product of the reaction may be isolated in the free acid form or in salt form by appropriate adjustment of the pH with a suitable base. In a preferred isolation procedure, the initial free acid product is first absorbed on activated charcoal and then converted to the diammonium salt by eluting the charcoal with a solvent mixture made up of ethanol, water, and ammonium hydroxide. The diammonium salt can then be converted back to the free acid by ion exchange techniques, or it can be converted to other salts by direct reaction with suitable salt-forming substances. The free acid 9-(β-D-arabinofuranosyl)adenine, 5'-phosphate can also be converted to other salts by direct reaction with a suitable base. The ion exchange techniques and salt-forming procedures are illustrated in greater detail hereinafter.

The various salts comprehended within the present invention include those formed with the ammonium ion, alkali metal cations, and alkaline earth metal cations. These salts and the free acid 9-(β-D-arabinofuranosyl) adenine, 5'-phosphate may differ in certain physical properties, but they are otherwise equivalent for purposes of the invention.

9-(β-D-arabinofuranosyl)adenine, 5'-phosphate, in free acid or in salt form, is useful as a pharmacological agent, especially as an antiviral agent. As such, it has been found to be active against Herpes simplex virus.

Antiviral activity can be quantitatively measured in an in vitro test by utilizing the plaque reduction technique first developed by Dulbecco [Proc. Natl. Acad. Sci., vol. 38, pages 747–752 (1952)] and modified by Hsiung and Melnick [Virology, vol. 1, pages 533–535 (1955)]. In this test, a complete cell monolayer is first grown in a glass test unit. The growth medium is then removed, and the virus is adsorbed on the cell monolayer for a measured time period. In the absence of an antiviral agent, the virus will destroy well defined areas of cells, called plaques, that can be seen macroscopically when the vital stain, neutral red, is added to the system. To test the inhibiting effect of a given compound, the test compound in solution is added to the virus-cell system, and the whole is covered with a nutrient agar overlay containing neutral red. After incubation, the plaques are counted, and the number of plaques produced in the system containing the test compound is compared with the number produced in the control systems, from which only the test compound is omitted. The inhibitory activity of a test compound is reported as the percentage reduction of the plaque count on the test units compared with that on the controls.

When tested by this plaque reduction technique, with 4-oz. glass bottles serving as the test unit and H. Ep. #2 cells making up the cell monolayer, 9-(β-D-arabinofuranosyl)adenine, 5'-phosphate, diammonium salt, at a concentration of 25 micrograms/ml. in Hanks' Balanced Salt Solution (pH 7–8) was found to give a 93% plaque reduction against Herpes simplex virus.

The invention is illustrated by the following examples.

EXAMPLE 1

To a stirred mixture of 10 ml. of glacial acetic acid and 2.0 ml. of pyridine, cooled to 5° C., is added first 2.0 g. of 9-(β-D-arabinofuranosyl)adenine and then 4.0 ml. of phosphorus oxychloride, and the resulting suspension is stirred and cooled in an ice-bath for about 90 minutes or until a clear solution is obtained. The solution is kept in the ice-bath for 4 hours more, 80 ml. of ice-water is added, and the aqueous mixture is stirred for 15 minutes, treated with 50% aqueous sodium hydroxide to adjust the pH to 1.6, stirred for 20 minutes more, and then treated with additional 50% aqueous sodium hydroxide to maintain a pH 1.6–1.8. Activated charcoal (Darco G-60 is suitable; 20 g.) and 20 g. of diatomaceous earth (Celite 545 may be used) are added, and the resulting suspension is stirred for 20 minutes. The mixture is filtered, and the solid cake that is isolated is washed with water until free of salts and then eluted with 400 ml. of a solvent mixture that is made up of 50 parts of ethanol, 50 parts of water, and 3 parts of concentrated ammonium hydroxide. The eluate is concentrated under reduced pressure, the syrupy residue obtained is dissolved in water, and the aqueous solution is subjected to lyophilization to give 9-(β-D-arabinofuranosyl)adenine, 5'-phosphate, diammonium salt, obtained as a powdery solid. The ultraviolet spectrum of this product in water shows $\lambda_{max}$ 259 m$\mu$, $E_1^1$ 324. It shows one zone by paper chromatography using a solvent mixture composed of 6 parts of 2-propanol, 3 parts of water, and 1 part of concentrated aqueous ammonium hydroxide, descending for 15–16 hours; $R_f$ [relative to 9-(β-D-arabinofuranosyl)adenine]=0.58–0.60. It can be further purified by precipitation from warm methanol solution with acetone. The ultraviolet spectrum of the precipitated solid in water shows $\lambda_{max}$ 259 m$\mu$, $E_1^1$ 352.

9-(β-D-arabinofuranosyl)adenine, 5'-phosphate, diammonium salt, 200 mg., is dissolved in 50 ml. of water, the aqueous solution is passed through a 2 x 18 cm. column of 50 ml. of a strongly basic trimethyl benzyl ammonium anion exchange resin, such as Dowex 1–X2 in the Cl$^-$ form, and the column is eluted with a gradient of .005 N hydrochloric acid 0.1 N hydrochloric acid. The eluates obtained contain only 9-(β-D-arabinofuranosyl)adenine, 5'-phosphate, in free acid form, as shown by a single elution peak determined colorimetrically on aliquot portions treated with aqueous phenol and sulfuric acid. The eluates are combined, the pH of the combined solution is adjusted to 5.8 with 2 N aqueous lithium hydroxide, and the resulting solution is evaporated to dryness under reduced pressure to give a syrupy residue of 9-(β-D-arabinofuranosyl)adenine, 5'-phosphate, dilithium salt, which is purified by precipitation from ethanol solution with acetone. The ultraviolet spectrum of the colorless powdery solid obtained in water shows $\lambda_{max}$ 259 m$\mu$, $E_1^1$ 368. The dilithium salt is also optically active; $[\alpha]_D^{25}+12°$ (1.0% in water).

9-(β-D-arabinofuranosyl)adenine, 5'-phosphate, barium salt can be obtained by treating an aqueous solution of 9-(β-D-arabinofuranosyl)adenine, 5'-phosphate, diammonium salt with an equivalent amount of barium acetate and then adding methanol to the resulting solution to precipitate the desired barium salt.

EXAMPLE 2

A solution of 2.0 g. of 9-(β-D-arabinofuranosyl)adenine, 5'-phosphate, diammonium salt in 200 ml. of water is percolated slowly through a 2 x 18 cm. column prepared from 18 ml. of a strongly acidic nuclear sulfonated styrene-divinylbenzene cation exchange resin, such as Dowex 50–X8 in the H$^+$ form. After the first 200 ml. has passed through the column, the column is eluted with 500 ml. more of water, and the eluate obtained is lyophilized to give 9-(β-D-arabinofuranosyl)adenine, 5'-phosphate, is free acid form, as a colorless powdery solid. This solid is crystallized from a small amount of warm water to give 9-(β-D-arabinofuranosyl)adenine, 5'-phosphate, monohydrate; colorless needles, M.P.: darkens at 205° C., decomposes at 211–213° C.; $[\alpha]_D^{25}+17.7°$ (1.04% in water at pH 7). The ultraviolet spectrum in a buffered aqueous phosphate solution (pH 7) shows $\lambda_{max}$ 259 m$\mu$, $E_1^1$ 418. In the periodate oxidation test, each mole of this product absorbs 1.06 mole of periodate, which result indicates that the product is exclusively 9-(β-D-arabinofuranosyl)adenine, 5'-phosphate.

We claim:
1. Process for the production of a member of the class consisting of 9-(β-D-arabinofuranosyl)adenine, 5'-phosphate, which in the free acid form has the formula

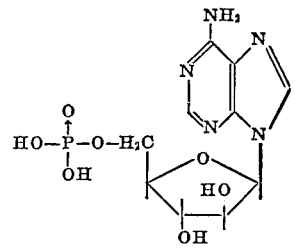

and salts thereof, in which
9-(β-D-arabinofuranosyl)adenine (a)
is reacted with phosphorus oxychloride (b)
in excess glacial acetic acid (c)
in the presence of a tertiary amine base (d)
at a temperature between 0 and 25° C., substantially in the absence of any other or additional components, the molar ratio of (a), (b), (c), and (d) in the reaction mixture being 1:4–8:16–32:2–10, respectively.

2. Process according to claim 1 wherein the tertiary amine base is pyridine.

3. Process according to claim 1 wherein the tertiary amine base is pyridine and the reaction is carried out at a temperature between 0 and 10° C.

4. Process according to claim 3 wherein the initial reaction product is treated with ammonium hydroxide to produce 9-(β-D-arabinofuranosyl)adenine, 5'-phosphate, diammonium salt.

References Cited
UNITED STATES PATENTS

| | | | |
|---|---|---|---|
| 3,413,283 | 11/1968 | Nomura et al. | 260—211.5 R |
| 3,444,158 | 5/1969 | Honjo et al. | 260—211.5 R |
| 3,464,973 | 9/1969 | Ouchi et al. | 260—211.5 R |

LEWIS GOTTS, Primary Examiner

J. R. BROWN, Assistant Examiner

U.S. Cl. X.R.
424—180